US009409086B2

(12) United States Patent
Fujino et al.

(10) Patent No.: US 9,409,086 B2
(45) Date of Patent: Aug. 9, 2016

(54) GAMING DEVICE WITH OMNI-REACH SHOULDER BUTTONS

(71) Applicant: NINTENDO CO., LTD., Kyoto (JP)

(72) Inventors: Takaki Fujino, Kyoto (JP); Yui Ehara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 289 days.

(21) Appl. No.: 14/085,126

(22) Filed: Nov. 20, 2013

(65) Prior Publication Data

US 2015/0057079 A1  Feb. 26, 2015

(30) Foreign Application Priority Data

Aug. 26, 2013  (JP) .................................. 2013-174092

(51) Int. Cl.
*A63F 13/00* (2014.01)
*A63F 13/90* (2014.01)
*A63F 13/92* (2014.01)
*A63F 13/24* (2014.01)
*G06F 1/16* (2006.01)

(52) U.S. Cl.
CPC ................. *A63F 13/08* (2013.01); *A63F 13/24* (2014.09); *A63F 13/92* (2014.09); *G06F 1/1626* (2013.01); *G06F 1/1662* (2013.01); *G06F 1/1692* (2013.01)

(58) Field of Classification Search
CPC ......... A63F 13/08; A63F 13/24; A63F 13/26; A63F 13/92; G06F 1/1626
USPC .......................................................... 463/46
See application file for complete search history.

(56) References Cited

U.S. PATENT DOCUMENTS

| 4,542,903 | A  | * | 9/1985  | Yokoi et al. ..................... 463/31 |
| 2005/0113158 | A1 | * | 5/2005  | Sterchi et al. ..................... 463/3 |
| 2006/0258464 | A1 | * | 11/2006 | Kawanobe et al. ............. 463/46 |
| 2007/0202956 | A1 | * | 8/2007  | Ogasawara et al. ............. 463/46 |
| 2010/0235621 | A1 | * | 9/2010  | Winkler et al. ................ 713/153 |
| 2011/0264160 | A1 |   | 10/2011 | Lenz et al. |
| 2011/0304640 | A1 |   | 12/2011 | Noge |
| 2011/0306412 | A1 | * | 12/2011 | Ehara et al. ..................... 463/31 |
| 2013/0109473 | A1 |   | 5/2013  | Yamashita et al. |

FOREIGN PATENT DOCUMENTS

| EP | 2 557 478 | 2/2013 |
| JP | 2011-258156 | 12/2011 |
| WO | WO 97/00713 | 1/1997 |

OTHER PUBLICATIONS

"Installing the Vonage Phone Device", [dated Aug. 4, 2011]. [online], [retrieved Oct. 29, 2015]. Retrieved from the Internet <URL:http://www.youtube.com/watch?v=h64TIgcJ1UY>. 1 page.*

(Continued)

*Primary Examiner* — Lawrence Galka
(74) *Attorney, Agent, or Firm* — Nixon & Vanderhye P.C.

(57) ABSTRACT

An example of an information processing apparatus is portable and performs predetermined processing in accordance with a user operation. The information processing apparatus includes: a plate-like housing so shaped that a thickness of an upper side surface of the housing is greater than a thickness of a lower side surface of the housing such that the closer to the lower side surface, the thinner the housing; and at least one operation button provided on the upper side surface of the housing.

14 Claims, 7 Drawing Sheets

(56) References Cited

OTHER PUBLICATIONS

"TP-LINK TL-WR841N Unboxing", [dated Jan. 15, 2013]. [online], [retrieved Oct. 29, 2015]. Retrieved from the Internet <URL:http://www.youtube.com/watch?v=s5ra645ceAs>. 1 page.*

"Game Boy Advance". From Wikipedia, The Free Encylopedia. [online], [retrieved on Oct. 27, 2015]. Retrieved from the Internet <URL: https://en.wikipedia.org/wiki/Game_Boy_Advance>. 9 pages.*

European Search Report (7 pages) dated Feb. 3, 2015 issued in corresponding European Application No. 13193054.7.

* cited by examiner

GAMING DEVICE WITH OMNI-REACH SHOULDER BUTTONS

CROSS REFERENCE TO RELATED APPLICATION

The disclosure of Japanese Patent Application No. 2013-174092, filed on Aug. 26, 2013, is incorporated herein by reference.

FIELD

The technology shown here relates to an information processing apparatus and an information processing system, and in particular, relates to a portable information processing apparatus and an information processing system including a portable input apparatus.

BACKGROUND AND SUMMARY

Conventionally, there is a handheld game apparatus having a lower housing and an upper housing connected to each other so as to be openable and closable in a folding manner (foldable). In the game apparatus, display screens are provided in the lower housing and the upper housing, and various operation buttons are provided in the lower housing. Further, near the connection portion of the lower housing and the upper housing, operation buttons (an L button and an R button) are provided at the left and right ends of the upper side surface of the lower housing.

In the game apparatus, the lower housing is almost cuboid, except for the connection portion of the lower housing and the upper housing. Then, the operation buttons at the left and right ends of the upper side surface are merely placed on a certain surface of the cuboid. Thus, there is room for improvement in the operability of the operation buttons when they are operated.

Therefore, it is an object of an exemplary embodiment to provide a novel information processing apparatus and a novel information processing system. Further, it is another object of the exemplary embodiment to provide an information processing apparatus and an information processing system that have excellent operability.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of an information processing apparatus according to the exemplary embodiment is a portable information processing apparatus for performing predetermined processing in accordance with a user operation. The information processing apparatus includes a plate-like housing and at least one operation button. The housing is so shaped that a thickness of an upper side surface of the housing is greater than a thickness of a lower side surface of the housing such that the closer to the lower side surface, the thinner the housing. The operation button is provided on the upper side surface of the housing.

Based on the above, it is possible to achieve a novel information processing apparatus.

In addition, a length of a press surface of the operation button in a thickness direction of the upper side surface may be almost the same as the thickness of the upper side surface.

Based on the above, the pressing of the operation button provided on the upper side surface is facilitated.

In addition, an inclined surface may be formed on at least a part of the upper side surface, the inclined surface having a slope that is inclined outward and extends toward a front surface of the housing.

Based on the above, a user can stably hold the information processing apparatus. This makes it possible to prevent the user from dropping the information processing apparatus while operating it.

In addition, an inclined surface may be formed on the operation button, the inclined surface having a slope that is inclined outward and extends toward a front surface of the housing.

Based on the above, it is possible to operate the operation button at a press position that facilitates the operation, and therefore possible to improve the operability of the operation button.

In addition, inclined surfaces may be formed on at least part of a left side surface and a right side surface of the housing, the inclined surfaces having slopes that are inclined outward and extend toward a front surface of the housing.

Based on the above, a user can stably hold the information processing apparatus. This makes it possible to prevent the user from dropping the information processing apparatus while operating it.

In addition, the inclined surfaces formed on the at least part of the left side surface and the right side surface of the housing may be formed on almost an entirety of the left side surface and the right side surface of the housing.

Based on the above, the user can hold the information processing apparatus more stably. Further, the visibility of the front surface of the housing (for example, the visibility of a display screen provided on the front surface) is improved.

In addition, the information processing apparatus may further include at least one operation section. The operation section is provided on an upper side surface side on a front surface of the housing and different from the operation button.

Based on the above, even when both the operation button and the operation section are operated, it is possible to prevent the reduction in the operability.

In addition, a center of gravity of the information processing apparatus may be set on an upper side surface side of the housing.

Based on the above, a user can stably hold the information processing apparatus. This provides an excellent operation feeling when moving the information processing apparatus while holding it.

In addition, the at least one operation button may be two operation buttons provided on left and right of the upper side surface of the housing.

In addition, the two operation buttons may be provided in left and right end portions of the upper side surface of the housing.

Based on the above, the operability of the two operation buttons provided on the left and right of the upper side surface is improved.

In addition, the information processing apparatus may further include a plurality of display screens. The display screens are provided on a front surface of the housing.

Based on the above, it is possible to operate the information processing apparatus while viewing images displayed on the plurality of display screens provided on the front surface of the housing.

In addition, the plurality of display screens may be formed using a plurality of portions of a single display screen.

Based on the above, it is possible to greatly reduce the component costs and the production costs of the apparatus.

In addition, the operation button provided on the left may be configured to be pressed at least in a direction from the upper side surface to the lower side surface and in a direction from left to right. The operation button provided on the right may be configured to be pressed at least in a direction from the upper side surface to the lower side surface and in a direction from right to left.

Based on the above, an operation of pressing the operation buttons is facilitated.

In addition, in the operation button provided on the left, a press surface to be pressed by a user may be formed into a curved surface that connects the upper side surface and a left side surface of the housing. In the operation button provided on the right, a press surface to be pressed by the user may be formed into a curved surface that connects the upper side surface and a right side surface of the housing.

Based on the above, each of the press surfaces is formed into a curved surface, and therefore is suitable for an operation of pressing the operation button from various directions.

In addition, each of the curved surfaces may be formed into a quadrant arc.

Based on the above, each of the press surfaces is formed into a quadrant arc, and therefore is suitable for an operation of pressing the operation button from various directions such as a vertical direction, a horizontal direction, and an oblique direction.

In addition, the exemplary embodiment may be implemented also in the form of an information processing system including an input apparatus having the above components.

Based on the exemplary embodiment, it is possible to achieve a novel information processing apparatus, a novel input apparatus, and the like.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
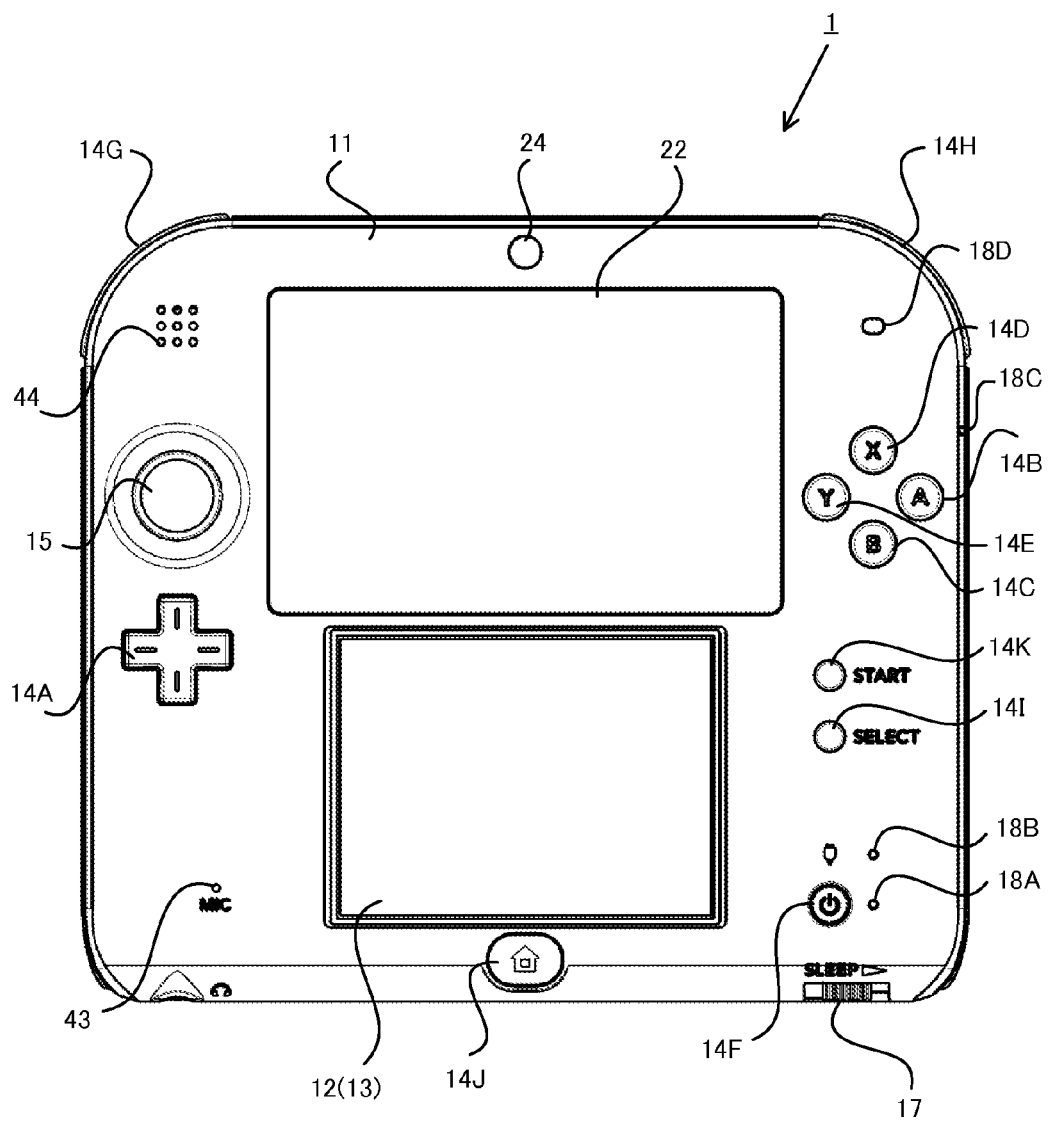
FIG. 1 is a front view showing a non-limiting example of a game apparatus 1.
Figure 2:
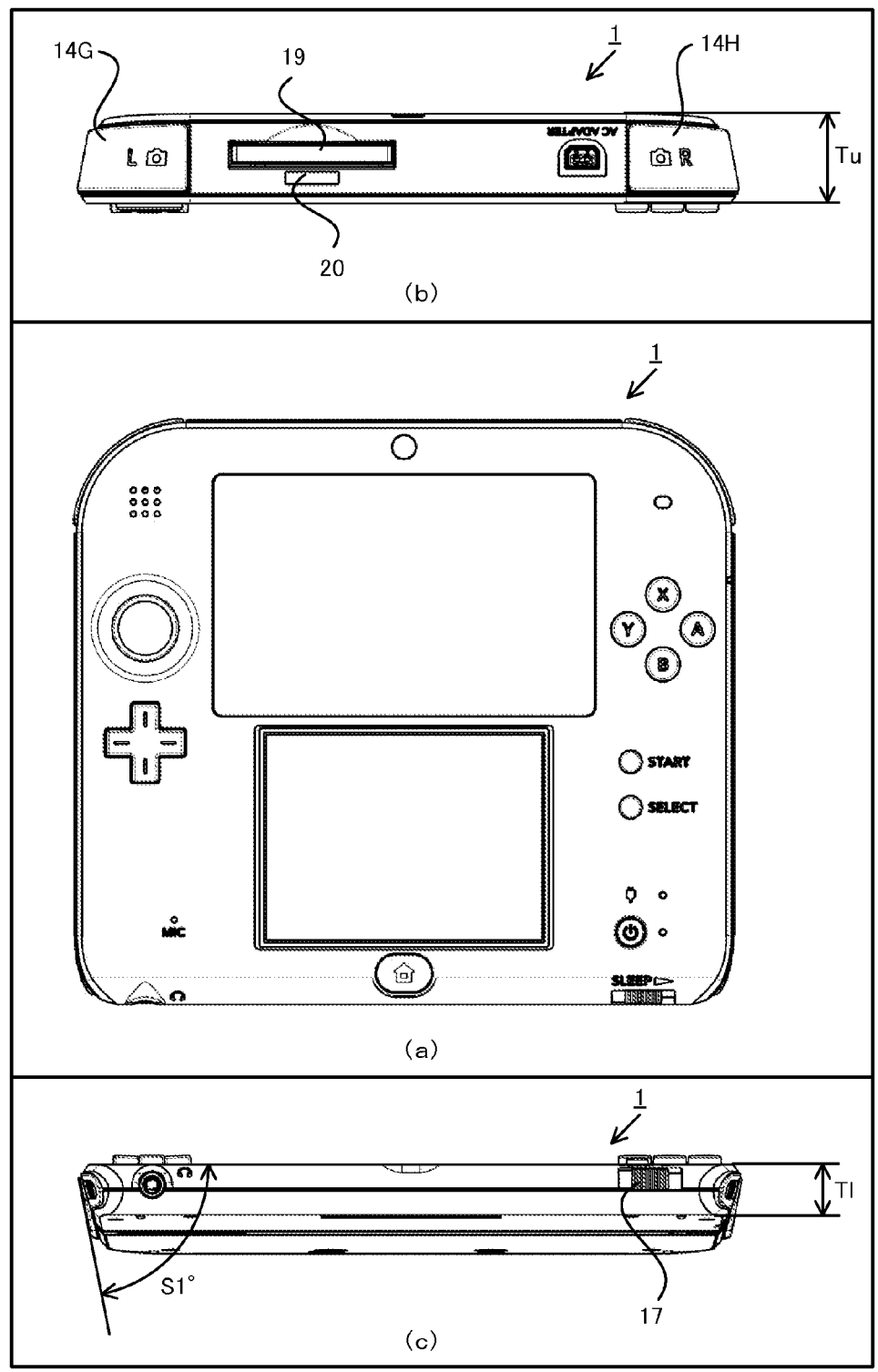
FIG. 2 is a front view, a top view, and a bottom view showing a non-limiting example of the game apparatus 1.
Figure 3:
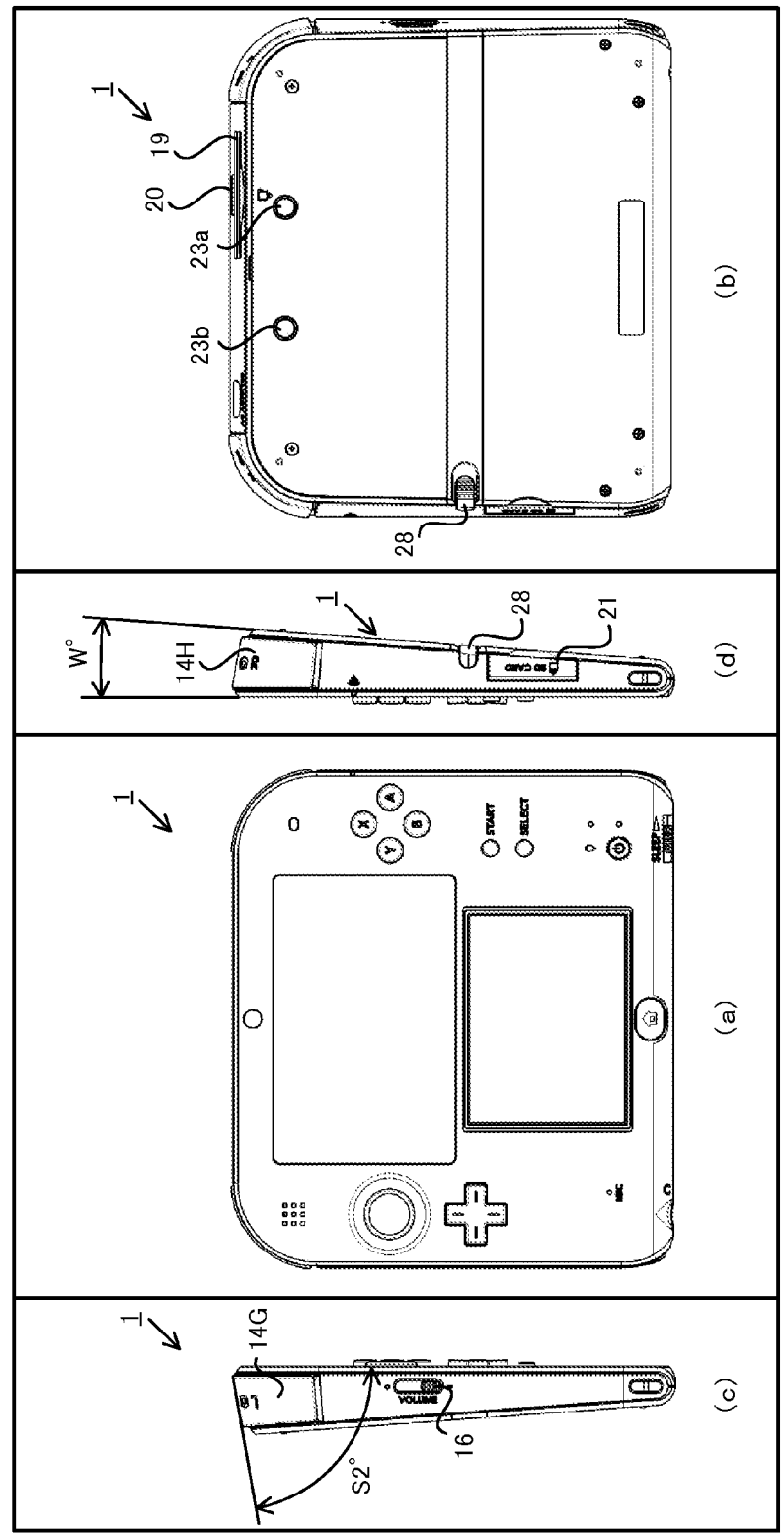
FIG. 3 is a front view, a rear view, a left side view, and a right side view showing a non-limiting example of the game apparatus 1.
Figure 4:
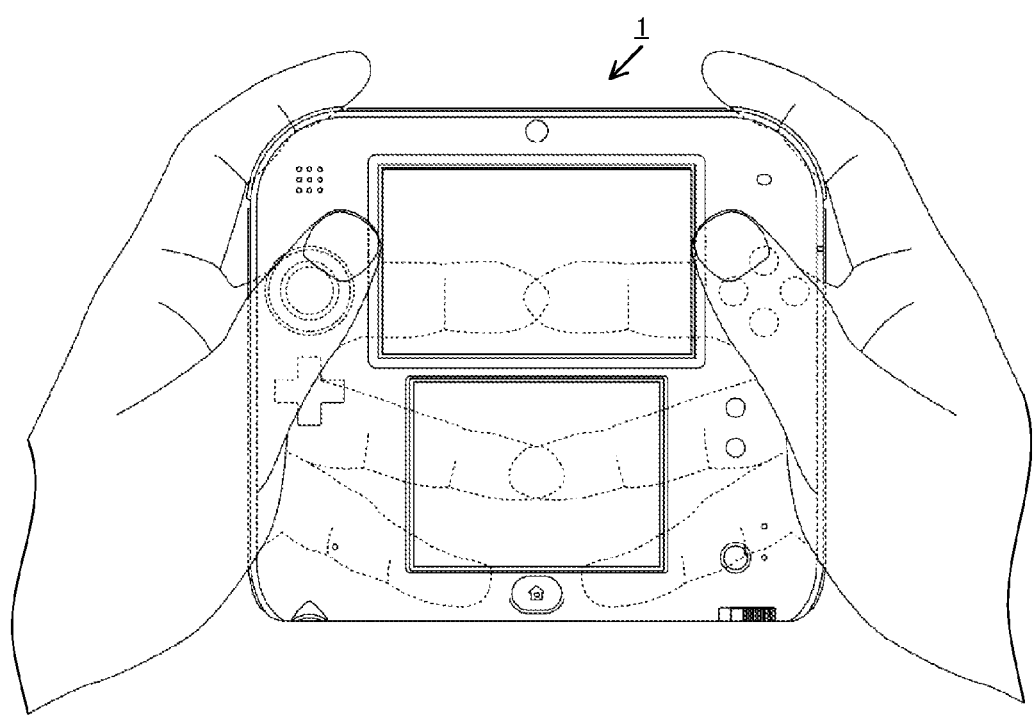
FIG. 4 is a diagram showing a non-limiting example of the state where a user holds the game apparatus 1.

With reference to FIGS. 1 to 4, an information processing apparatus according to an exemplary embodiment is described. Although the information processing apparatus according to the exemplary embodiment can execute any program, an example of the information processing apparatus is described using a handheld game apparatus 1 that executes a game program. It should be noted that FIGS. 1 to 4 are diagrams showing examples of the appearance of the game apparatus 1. FIG. 1 is a front view showing an example of the game apparatus 1. In FIG. 2, (a) is a front view of the game apparatus 1, (b) is a top view of the game apparatus 1, and (c) is a bottom view of the game apparatus 1. In FIG. 3, (a) is a front view of the game apparatus 1, (b) is a rear view of the game apparatus 1, (c) is a left side view of the game apparatus 1, and (d) is a right side view of the game apparatus 1. FIG. 4 is a diagram showing an example of the state where a user holds the game apparatus 1. The game apparatus 1 includes capturing sections, and for example, can capture an image using the capturing sections, display the captured image on a screen, and store data of the captured image. Further, the game apparatus 1 can execute a program (for example, a game program) stored in an exchangeable memory card or received from a server or another game apparatus, and can also display on the screen an image generated by computer graphics processing, such as an image captured by a virtual camera set in a virtual space.

In FIGS. 1 to 4, the game apparatus 1 includes a housing 11 that can be held by a user. The housing 11 is formed into a plate shape such that the main surface (front surface) of the housing 11 is rectangular (for example, approximately square). Normally, the user uses the game apparatus 1 while viewing the front surface of the game apparatus 1. Then, when not using the game apparatus 1, the user stores away the game apparatus 1 by putting the game apparatus 1 into a power-off state or a sleep state.

As an example, the following are provided outside or inside the housing 11: a lower LCD (Liquid Crystal Display) 12; a touch panel 13; operation buttons 14A to 14K; an analog stick 15; a sound volume slider 16; a sleep slider 17; LEDs 18A to 18D; a first card connector 19; an infrared light receiving/emitting section 20; a second card connector 21; an upper LCD 22; an outer capturing section 23 including two capturing sections (a left outer capturing section 23a and a right outer capturing section 23b); an inner capturing section 24; a touch pen 28; a microphone 43; a loudspeaker 44; and the like. The details of these components are described below.

As shown in FIG. 1, the upper LCD 22 and the upper LCD 22 are accommodated in the housing 11. The lower LCD 12 has a horizontally long shape and is placed such that the long side direction of the lower LCD 12 coincides with the left-right direction of the housing 11. The lower LCD 12 is provided on the front surface (main surface) of the housing 11 and in the lower center of the housing 11. As an example, the lower LCD 12 is a display device that displays an image in a planar manner (not in a stereoscopically visible manner). The upper LCD 22 has a horizontally long shape and is placed such that the long side direction of the upper LCD 22 coincides with the left-right direction of the housing 11. Then, the upper LCD 22 is provided on the front surface (main surface) of the housing 11 and in the upper center of the housing 11. As an example, the area of the screen of the upper LCD 22 is set to be greater than that of the lower LCD 12. Specifically, the screen of the upper LCD 22 is set to be horizontally longer than the screen of the lower LCD 12. That is, the proportion of the width in the aspect ratio of the screen of the upper LCD 22 is set to be greater than that of the lower LCD 12. Then, similarly to the lower LCD 12, the upper LCD 22 is a display device that displays an image in a planar manner. It should be noted that although an LCD is used as a display device in the exemplary embodiment, any other display device may be used, such as a display device using electroluminescence (EL). Further, a display device having any resolution may be used as the lower LCD 12 and the upper LCD 22.

As shown in FIG. 1, the game apparatus 1 includes the touch panel 13 as an input device. The touch panel 13 is mounted so as to cover the screen of the lower LCD 12. It should be noted that in the exemplary embodiment, the touch panel 13 may be, for example, a resistive touch panel. The touch panel, however, may be not only a resistive touch panel but also a touch panel of any pressure type, such as an electrostatic capacitance type. For example, the touch panel 13 may have the same resolution (detection accuracy) as that of the lower LCD 12. The resolutions of the touch panel 13 and the lower LCD 12, however, may not necessarily need to coincide with each other. Further, as shown in (b) and (d) of FIG. 3, an insertion slot for accommodating the touch pen 28 is provided on the back surface of the housing 11, and the touch pen 28 is accommodated in the insertion slot. An input on the touch panel 13 is normally provided using the touch pen 28, but an input can be provided on the touch panel 13 not only by the touch pen 28 but also by a finger of the user.

The operation buttons 14A to 14K are each an input device for the user to provide an input by performing a pressing operation. As shown in FIG. 1, among the operation buttons 14A to 14K, the directional button 14A (the direction input button 14A), the operation button 14B, the operation button 14C, the operation button 14D, the operation button 14E, the power button 14F, the select button 14I, the home button 14J, and the start button 14K are provided on the front surface (main surface) of the housing 11. The directional button 14A has a cross-shaped button for indicating up, down, left, and right directions, and is provided near a central portion at the left end of the housing 11. The operation button 14B (for example, an A button), the operation button 14C (for example, a B button), the operation button 14D (for example, an X button), and the operation button 14E (for example, a Y button) are placed in a cross formation and provided in an upper portion at the right end of the housing 11 (at a position to the right of the upper LCD 22). The operation buttons 14A to 14E, the select button 14I, the home button 14J, and the start button 14K are appropriately assigned functions based on the program to be executed by the game apparatus 1. The directional button 14A is used for, for example, a selection operation. The operation buttons 14B to 14E are used for, for example, a determination operation or a cancellation operation. The power button 14F is used to turn on/off the game apparatus 1.

The analog stick 15 is an input device for indicating a direction, and is provided in an upper portion at the left end of the front surface (main surface) of the housing 11 (at a position to the left of the upper LCD 22). As shown in FIG. 1, the analog stick 15 is provided above the directional button 14A. The analog stick 15 and the directional button 14A are provided so as to be operated with the thumb of the left hand holding the housing 11 (see FIG. 4). Further, the provision of the analog stick 15 in an upper portion on the left locates the analog stick 15 at a position where the thumb of the left hand holding the housing 11 is naturally placed, and also locates the directional button 14A at a position where the thumb of the left hand shifted slightly downward from the analog stick 15 is placed. The key top of the analog stick 15 is configured to slide parallel to the front surface of the housing 11. The analog stick 15 functions in accordance with the program to be executed by the game apparatus 1. For example, when a game where a predetermined object appears in a three-dimensional virtual space is executed by the game apparatus 1, the analog stick 15 functions as an input apparatus for causing the predetermined object to move in the three-dimensional virtual space. In this case, the predetermined object is caused to move in the direction in which the key top of the analog stick 15 has slid. It should be noted that the analog stick 15 may be a component capable of providing an analog input by being tilted by a predetermined amount in any one of up, down, right, left, and diagonal directions.

In addition, as shown in FIG. 1, a hole for inputting a sound to the microphone 43 is provided on the front surface of the housing 11. The microphone 43 is provided under the hole and detects a sound outside the game apparatus 1. Further, holes for outputting the sound of the loudspeaker 44 to the outside of the game apparatus 1 are provided on the front surface of the housing 11. The loudspeaker 44 is provided under the holes and outputs a sound to the outside of the game apparatus 1 through the holes.

As shown in FIG. 1, the inner capturing section 24 is provided on the front surface of the housing 11 and functions as a capturing section of which the capturing direction is the direction normal to the front surface and extending therefrom to the near side. The inner capturing section 24 includes an imaging device (for example, a CCD image sensor or a CMOS image sensor) having a predetermined resolution, and a lens. The lens may have a zoom mechanism.

The inner capturing section 24 is placed above the upper end of the screen of the upper LCD 22 and in the center of the housing 11 in the left-right direction (on the line dividing the housing 11 (the screen of the upper LCD 22) into two equal left and right parts). Then, the inner capturing section 24 captures an image in the direction opposite to that of the outer capturing section 23 described later. For example, when the user views the upper LCD 22 or the lower LCD 12 from the front thereof, the inner capturing section 24 can capture the user's face from the front.

As shown in FIG. 1, the first LED 18A is provided to the right of the power button 14F on the front surface of the housing 11. The first LED 18A notifies the user of the on/off state of the power supply of the game apparatus 1. Further, the second LED 18B is provided above the first LED 18A on the front surface of the housing 11. The second LED 18B notifies the user that the game apparatus 1 is being charged. Further, the third LED 18C is provided in a right end portion of the housing 11. The third LED 18C notifies the user of the establishment state of wireless communication of the game apparatus 1. For example, the game apparatus 1 can communicate wirelessly with other devices, and the third LED 18C lights up when wireless communication is established between the game apparatus 1 and other devices. The game apparatus 1 has the function of establishing connection with a wireless LAN by, for example, a method based on the IEEE 802.11.b/g/n/ac/ad standard. Further, the fourth LED 18D is provided on the front surface of the housing 11. The fourth LED 18D lights up when the user of the game apparatus 1 is notified of something.

As shown in FIG. 1 and (c) of FIG. 2, the sleep slider 17 is provided in a lower end portion of the housing 11. The sleep slider 17 is an input apparatus that is operated when the user causes the game apparatus 1 to transition from a normal operation mode to a sleep mode, or to transition from the sleep mode to the normal operation mode. For example, the user may perform an operation of sliding the sleep slider 17 while a game is being performed in the normal operation mode in the game apparatus 1. This makes it possible to suspend the game and cause the game apparatus 1 to transition to the sleep mode, which reduces the power consumption of the game apparatus 1. Further, the user may perform an operation of sliding the sleep slider 17 while the game apparatus 1 is in the sleep mode. This makes it possible to return the game apparatus 1 to the normal operation mode and resume the game suspended by the transition to the sleep mode.

As shown in FIG. 1, (b) of FIG. 2, and (c) and (d) of FIG. 3, the L button 14G and the R button 14H are provided on the upper side surface of the lower housing 11. The L button 14G is provided at a position that is the corner of a left end portion of the upper side surface and an upper end portion of the left side surface of the housing 11. Further, the R button 14H is provided at a position that is the corner of a right end portion of the upper side surface and an upper end portion of the right side surface of the housing 11. The L button 14G and the R button 14H are each an input apparatus for the user to provide an input by performing a pressing operation, and are appropriately assigned functions based on the program to be executed by the game apparatus 1.

As shown in FIG. 1, in the L button 14G, a press surface to be pressed by the user is formed into a curved surface that connects the upper side surface and the left side surface of the housing 11. As an example, the curved surface is formed into a quadrant arc. Further, in the R button 14H, a press surface to be pressed by the user is formed into a curved surface that connects the upper side surface and the right side surface of the housing 11. As an example, the curved surface is formed into a quadrant arc. Then, the L button 14G and the R button 14H are configured to be pressed at least in an up-down direction (the direction from the upper side surface to the lower side surface of the housing 11) and in a left-right direction (the direction from the left side surface to the right side surface of the housing 11 or the direction from the right side surface to the left side surface of the housing 11). It should be noted that the structures and the detailed shapes of the L button 14G and the R button 14H will be described later.

As shown in (c) of FIG. 3, the sound volume slider 16 is provided on the left side surface of the housing 11. The sound volume slider 16 is used to adjust the volume of the sound output from the loudspeaker 44 of the game apparatus 1.

As shown in (d) of FIG. 3, a cover section is provided on the right side surface of the housing 11 such that the second card connector 21 is placed inside the cover section. The second card connector 21 electrically connects the game apparatus 1 and a data storage external memory 46. The data storage external memory 46 is detachably attached to the second card connector 21 by opening the cover section. The data storage external memory 46 is used to, for example, store (save) various types of data such as data of an image captured by the game apparatus 1.

As shown in (b) of FIG. 2, an insertion slot is formed on the upper side surface of the housing 11 such that the first card connector 19 is provided within the insertion slot. An external memory 45 having stored therein a game program is inserted into the insertion slot, and the external memory 45 and the first card connector 19 are electrically and detachably connected to each other. The external memory 45 is connected to the game apparatus 1, whereby the program stored in the external memory 45 is executed. It should be noted that in the example shown in (b) of FIG. 2, the first card connector 19 is provided in an area to the left of the center of the upper side surface of the housing 11.

In addition, as shown in (b) of FIG. 2, the infrared light receiving/emitting section 20 is provided on the upper side surface of the housing 11. When the game apparatus 1 communicates wirelessly with a game apparatus of the same type by a predetermined communication method (for example, infrared communication), the infrared light receiving/emitting section 20 emits and receives infrared light to and from the other game apparatus. It should be noted that in the example shown in (b) of FIG. 2, the infrared light receiving/emitting section 20 is provided in an area to the left of the center of the upper side surface of the housing 11 and is provided next to the first card connector 19 in a depth direction (the direction from the front surface to the back surface of the housing 11). Further, a rechargeable battery that serves as the power supply of the game apparatus 1 is accommodated in the housing 11. The battery can be charged through a terminal provided on the upper side surface of the housing 11.

As shown in (b) of FIG. 3, the left outer capturing section 23a and the right outer capturing section 23b are provided on the back surface of the housing 11. The left outer capturing section 23a and the right outer capturing section 23b are each set such that the capturing direction is the depth direction (that is, the direction normal to the front surface of the housing 11 and extending backward therefrom). Thus, the left outer capturing section 23a and the right outer capturing section 23b are each set such that the capturing direction is 180 degrees opposite to the direction normal to the display surface of the upper LCD 22 (and the lower LCD 12). Further, the capturing direction of the left outer capturing section 23a and the capturing direction of the right outer capturing section 23b are parallel to each other. Depending on the program to be executed by the game apparatus 1, the left outer capturing section 23a and the right outer capturing section 23b can be used as a stereo camera. Alternatively, depending on the program to be executed by the game apparatus 1, either one of the left outer capturing section 23a and the right outer capturing section 23b may be used solely so that the outer capturing section 23 can also be used as a non-stereo camera. Yet alternatively, depending on the program to be executed by the game apparatus 1, images captured by the left outer capturing section 23a and the right outer capturing section 23b may be combined together, or may be used to compensate for each other, so that images can be captured in an extended capturing range. As an example, the left outer capturing section 23a and the right outer capturing section 23b each include an imaging device (for example, a CCD image sensor or a CMOS image sensor) having a predetermined common resolution, and a lens. It should be noted that the lens may have a zoom mechanism. Further, in the exemplary embodiment, the outer capturing section 23 is composed of two capturing sections, namely the left outer capturing section 23a and the right outer capturing section 23b. Alternatively, the outer capturing section 23 may be composed of one capturing section. Further, the capturing directions of the left outer capturing section 23a and the right outer capturing section 23b may be set to be the direction normal to the back surface of the housing 11.

The left outer capturing section 23a and the right outer capturing section 23b are placed next to each other in the left-right direction of the game apparatus 1. That is, the left outer capturing section 23a and the right outer capturing section 23b are placed such that a straight line connecting the left outer capturing section 23a and the right outer capturing section 23b is parallel to the horizontal direction of the screen of the upper LCD 22. Then, the left outer capturing section 23a and the right outer capturing section 23b are placed symmetrically to each other with respect to the center of the upper LCD 22 in the left-right direction. That is, when the user views the screen of the upper LCD 22 from the front thereof, the left outer capturing section 23a is placed on the left, and the right outer capturing section 23b is placed on the right. Thus, when a program is being executed that causes the outer capturing section 23 to function as a stereo camera, the left outer capturing section 23a can capture a left-eye image, which is to be viewed with the user's left eye, and the right outer capturing section 23b can capture a right-eye image, which is to be viewed with the user's right eye.

Next, the detailed shape of the housing 11 is described. As described above, the housing 11 is formed into a plate shape such that the front surface of the housing 11 is approximately square. More specifically, as shown in (b) and (c) of FIG. 2 and (c) and (d) of FIG. 3, the front surface and the back surface of the housing 11 are not parallel to each other, and inclined surfaces and curved surfaces are formed on the left and right side surfaces and the upper side surface of the housing 11.

For example, as shown in (c) and (d) of FIG. 3, the front surface and the back surface of the housing 11 are placed so as to form a wedge shape such that the front surface and the back surface intersect with each other at an angle W°. Specifically, the housing 11 is so shaped that the upper side surface is thicker than the lower side surface (a thickness Tu of the upper side surface and a thickness Tl of the lower side surface shown in (b) and (c) of FIG. 2; Tu>Tl) such that the closer to the lower side surface, the thinner the housing 11. Based on this, when the game apparatus 1 is placed on a horizontal surface such as a desk with the back surface of the housing 11 in contact with the horizontal surface, the front surface of the housing 11 is positioned such that the upper end side is higher than the lower end side. This facilitates viewing images displayed on the upper LCD 22 and the lower LCD 12. Further, the housing 11 is formed into a wedge shape such that the upper side surface is thicker than the lower side surface such that the closer to the lower side surface, the thinner the housing 11. This facilitates holding the housing 11, and therefore improves the operability of the game apparatus 1 (see FIG. 4).

In addition, the thick formation of the upper end surface side of the housing 11 allows the arrangement of many components on the upper end surface side and also places the center of gravity of the game apparatus 1 on the upper end surface side (the upper LCD 22 side). For example, as shown in (b) of FIG. 3, the first card connector 19 and the infrared light receiving/emitting section 20 are placed one on top of the other near the upper end surface of the housing 11, and the left outer capturing section 23a is placed on top of the first card connector 19 and the infrared light receiving/emitting section 20. Further, in the exemplary embodiment, also the rechargeable battery that serves as the power source of the game apparatus 1 is placed on the upper end surface side of the housing 11. Thus, the center of gravity of the game apparatus 1 is placed on the upper end surface side. The center of gravity of the game apparatus 1 is thus placed on the upper end surface side of the housing 11, whereby the user can stably hold the game apparatus 1. This provides an excellent operation feeling when moving the game apparatus 1 while holding it.

In addition, the thick formation of the upper end surface side of the housing 11 makes it possible to provide the L button 14G and the R button 14H such that the L button 14G and the R button 14H placed on the upper end surface are large. For example, as shown in (b) of FIG. 2 and the like, the press surfaces of the L button 14G and the R button 14H are provided almost entirely in the thickness direction of the upper end surface. This improves the operability of the L button 14G and the R button 14H. It should be noted that the L button 14G and the R button 14H may not be provided almost entirely in the thickness direction of the upper end surface. The size of each press surface in the thickness direction may be two thirds of the thickness of the upper end surface. The size of each press surface in the thickness direction may be half the thickness of the upper end surface. Any of these press surfaces can improve the operability of the L button 14G and the R button 14H.

In addition, as shown in (c) and (d) of FIG. 3, the upper end surface of the housing 11 is placed so as to intersect with the front surface at an acute angle (an angle S2°). Specifically, the upper end surface of the housing 11 is an inclined surface having a slope that is inclined outward and extends toward the front surface of the housing at an angle 90−S2°. This enables the user to stably hold the game apparatus 1 by, as shown in FIG. 4, placing their fingers along the upper end surface when holding the game apparatus 1. This makes it possible to prevent the user from dropping the game apparatus 1 while operating it. Further, when the user views an image displayed on the upper LCD 22 or the lower LCD 12 from the front thereof by placing the game apparatus 1 on a horizontal surface such as a desk with the back surface of the housing 11 in contact with the horizontal surface, the upper end surface cannot be viewed. This improves the visibility of the upper LCD 22 and the lower LCD 12. Further, as shown in (b) of FIG. 2 and (c) and (d) of FIG. 3, the inclined surface may include the press surfaces of the L button 14G and the R button 14H. In this case, when the user presses the L button 14G and the R button 14H in the up-down direction (the direction from the upper side surface to the lower side surface of the housing 11), the user presses the press surfaces formed in the inclined surface. In this case, when the pressing of the inclined surface on the front surface side is compared with the pressing of the inclined surface on the back surface side, the press positions in the up-down direction are different by the amount of slope of the inclined surface. Thus, when, as shown in FIG. 4, the user presses the L button 14G and the R button 14H with their index fingers while causing both palms to abut left and right end portions of the game apparatus 1, the user can adjust the length from the position of each palm to the press position by the slope of the inclined surface, and therefore can operate the L button 14G and the R button 14H at press positions (lengths) that facilitate the operation.

In addition, as shown in (b) and (c) of FIG. 2, each of the left and right side surfaces of the housing 11 is placed so as to intersect with the front surface at an acute angle (an angle S1°). Specifically, the left and right side surfaces of the housing 11 are inclined surfaces having slopes that are inclined outward in a V-shaped manner and extend toward the front surface of the housing at an angle 90−S1°. This enables the user to stably hold the game apparatus 1 by, as shown in FIG. 4, by placing their palms or the like along the left and right side surfaces when holding the game apparatus 1. This makes it possible to prevent the user from dropping the game apparatus 1 while operating it. Further, when the user views an image displayed on the upper LCD 22 or the lower LCD 12 from the front thereof by placing the game apparatus 1 on a horizontal surface such as a desk with the back surface of the housing 11 in contact with the horizontal surface, the left and right side surfaces cannot be viewed. This improves the visibility of the upper LCD 22 and the lower LCD 12.

It should be noted that in the example described above, the inclined surfaces are formed on the entirety of the upper end surface and the left and right side surfaces of the housing 11. It goes without saying, however, that even if the inclined surfaces are formed on part of the upper end surface and the left and right side surfaces, it is possible to provide similar effects. For example, the upper end surface and the left and right side surfaces may be so shaped that middle portions between the back surface and the front surface protrude, and the surfaces from the back surface side to the protruding portions are formed into inclined surfaces having the above slopes (for example, elliptical or race-track-shaped cross-sections).

As shown in FIG. 4, the above shape of the housing 11 and the above arrangement of the input apparatuses in the housing 11 enable the user to hold the inclined surfaces formed on both side surfaces of the housing 11 and the back surface of the housing 11 with both palms, middle fingers, ring fingers, and little fingers, such that the front surface of the housing 11 (that is, the lower LCD 12 and the upper LCD 22) faces the user. By thus holding the housing 11, the user can perform operations on the operation buttons 14A to 14E and the analog stick 15 with their thumbs, and perform operations on the L button 14G and the R button 14H with their index fingers, while holding the housing 11. Particularly, the four buttons, namely the buttons 14B, 14C, 14D, and 14E, are placed on the upper end surface side of the housing 11 where the thumb of the right hand holding the lower housing 11 is naturally placed. The analog stick 15 is placed on the upper end surface side of the housing 11 where the thumb of the left hand holding the housing 11 is naturally placed. Further, these four buttons and the analog stick 15 are placed symmetrically to each other with respect to the upper LCD 22 in the left-right direction and are disposed at positions suitable for operating the four buttons and the analog stick 15 while viewing the upper LCD 22. Further, since these four buttons and the analog stick 15 are placed symmetrically to each other with respect to the upper LCD 22 in the left-right direction, for example, a left-handed person can also provide a direction indication input using these four buttons, depending on the game program.

Figure 5:
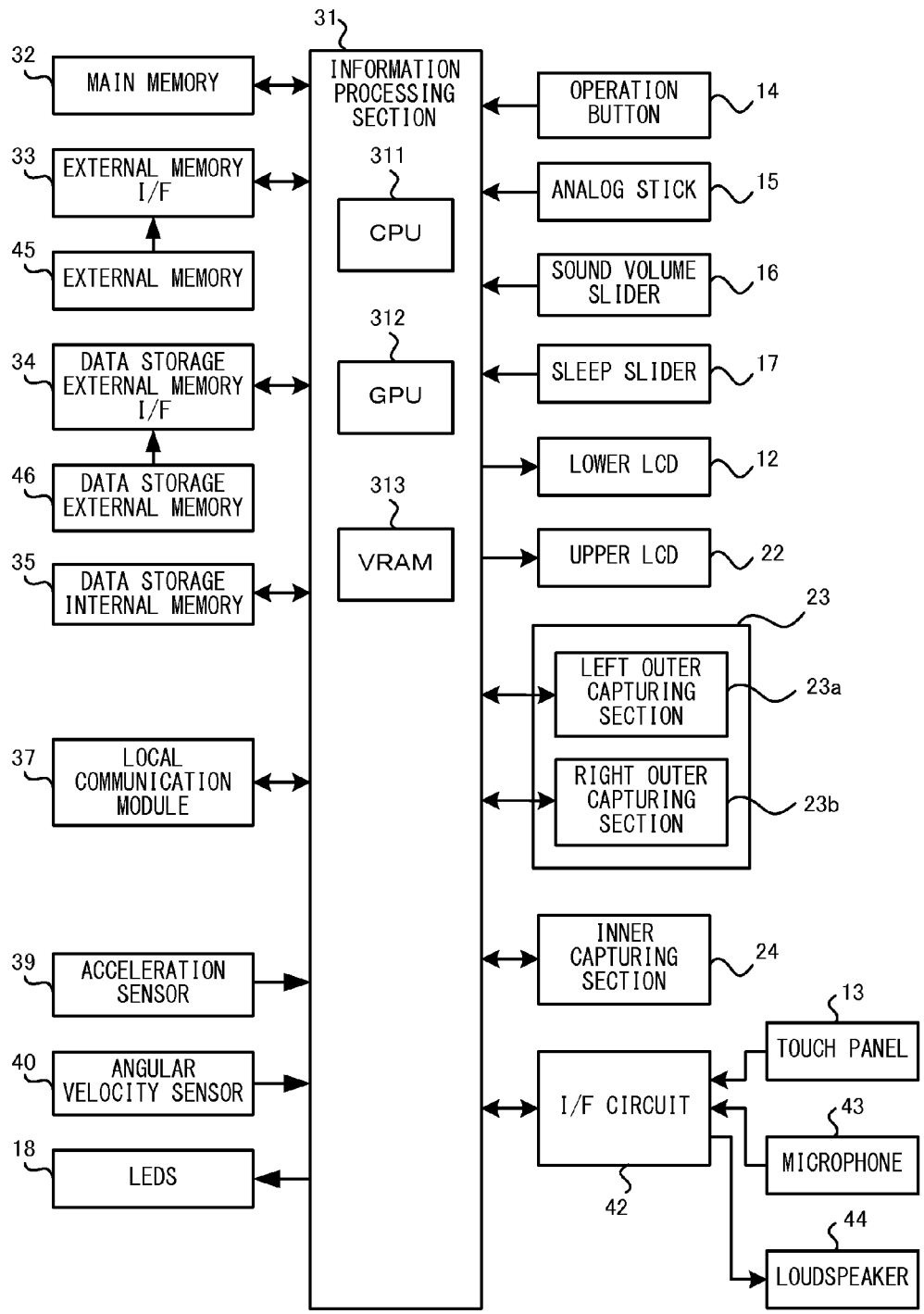
FIG. 5 is a block diagram showing a non-limiting example of the internal configuration of the game apparatus 1.

Next, with reference to FIG. 5, the internal configuration of the game apparatus 1 is described. It should be noted that FIG. 5 is a block diagram showing an example of the internal configuration of the game apparatus 1.

In FIG. 5, the game apparatus 1 includes electronic components such as an information processing section 31, a main memory 32, an external memory interface (external memory I/F) 33, data storage external memory I/F 34, a data storage internal memory 35, a local communication module 37, an acceleration sensor 39, an angular velocity sensor 40, and an interface circuit (I/F circuit) 42, in addition to the components described above. These electronic components are implemented on an electronic circuit board and accommodated in the housing 11.

The information processing section 31 is information processing means including a CPU (Central Processing Unit) 311 that executes a predetermined program, a GPU (Graphics Processing Unit) 312 that performs image processing, and the like. As an example, a program to be executed by the CPU 311 is stored in a memory (for example, an external memory 45 connected to the external memory I/F 33 or the data storage internal memory 35) included in the game apparatus 1. The CPU 311 executes the program, thereby performing information processing such as image processing and game processing. It should be noted that a program to be executed by the CPU 311 may be acquired from another apparatus by communication with said another apparatus. The information processing section 31 also includes a VRAM (Video RAM) 313. The GPU 312 generates an image in accordance with a command from the CPU 311 and draws the generated image in the VRAM 313. Then, the GPU 312 outputs the image drawn in the VRAM 313 to the upper LCD 22 and/or the lower LCD 12. This causes the image to be displayed on the upper LCD 22 and/or the lower LCD 12.

The information processing section 31 is connected to the main memory 32, the external memory I/F 33, the data storage external memory I/F 34, and the data storage internal memory 35. The main memory 32 is volatile storage means used as a work area or a buffer area of the CPU 311. That is, the main memory 32 temporarily stores various types of data used for information processing, and also temporarily stores a program acquired from the outside (the external memory 45, another device, or the like) of the game apparatus 1. The external memory I/F 33 is an interface for detachably connecting the external memory 45. Further, the data storage external memory I/F 34 is an interface for detachably connecting the data storage external memory 46.

The external memory 45 is non-volatile storage means for storing a program to be executed by the CPU 311. The external memory 45 is composed, for example, of a read-only semiconductor memory. The connection of the external memory 45 to the first card connector 19 enables the CPU 311 to load a program stored in the external memory 45. The data storage external memory 46 is composed of a readable/writable non-volatile memory (for example, a NAND flash memory) and is used to store predetermined data. For example, the data storage external memory 46 stores images captured by the outer capturing section 23 and the like. If the data storage external memory 46 has been connected to the second card connector 21, the CPU 311 can load an image stored in the data storage external memory 46, and cause the image to be displayed on the upper LCD 22 and/or the lower LCD 12.

The data storage internal memory 35 is composed of a readable/writable non-volatile memory (for example, a NAND flash memory) and is used to store predetermined data. For example, the data storage internal memory 35 stores data and programs acquired from another apparatus.

In addition, the acceleration sensor 39 is connected to the information processing section 31. The acceleration sensor 39 detects the magnitudes of accelerations (linear accelerations) in the directions of straight lines along three axial directions set in the game apparatus 1. The acceleration sensor 39 is provided within the housing 11. It should be noted that the acceleration sensor 39 may be an acceleration sensor for detecting an acceleration in one axial direction, or accelerations in two axial directions. The CPU 311 can calculate the orientation and the motion of the game apparatus 1 using data (acceleration data) representing the accelerations detected by the acceleration sensor 39.

In addition, the angular velocity sensor 40 is connected to the information processing section 31. The angular velocity sensor 40 detects the angular velocities generated about three axes set in the game apparatus 1. The angular velocity sensor 40 is provided within the housing 11. The CPU 311 can calculate the orientation and the motion of the game apparatus 1 using angular velocity data output from the angular velocity sensor 40.

The I/F circuit 42 is connected to the information processing section 31. The microphone 43, the loudspeaker 44, and the touch panel 13 are connected to the I/F circuit 42. The I/F circuit 42 includes: a sound control circuit that controls the input from the microphone 43 and the output to the loudspeaker 44; and a touch panel control circuit that controls the touch panel 13. For example, the sound control circuit performs A/D conversion or D/A conversion on a sound signal and converts the sound signal into sound data in a predetermined format. The touch panel control circuit generates touch position data in a predetermined format on the basis of a signal from the touch panel 13 and outputs the touch position data to the information processing section 31.

The operation buttons 14A to 14K (the operation button 14), the analog stick 15, the sound volume slider 16, and the sleep slider 17 are connected to the information processing section 31. Then, the operation button 14, the analog stick 15, the sound volume slider 16, and the sleep slider 17 each output an operation signal representing the state of the input to the input apparatus (whether or not the input apparatus has been pressed, the position of the slider, or the like).

The lower LCD 12 and the upper LCD 22 are connected to the information processing section 31. The lower LCD 12 and the upper LCD 22 display images in accordance with the instructions from the GPU 312. Further, the LEDs 18 are connected to the information processing section 31. The LEDs 18 light up or go out in accordance with the instructions from the information processing section 31.

The outer capturing section 23 and the inner capturing section 24 are connected to the information processing section 31. The outer capturing section 23 and the inner capturing section 24 capture images in accordance with the instructions from the information processing section 31 and output the captured image data to the information processing section 31.

Figure 6A:
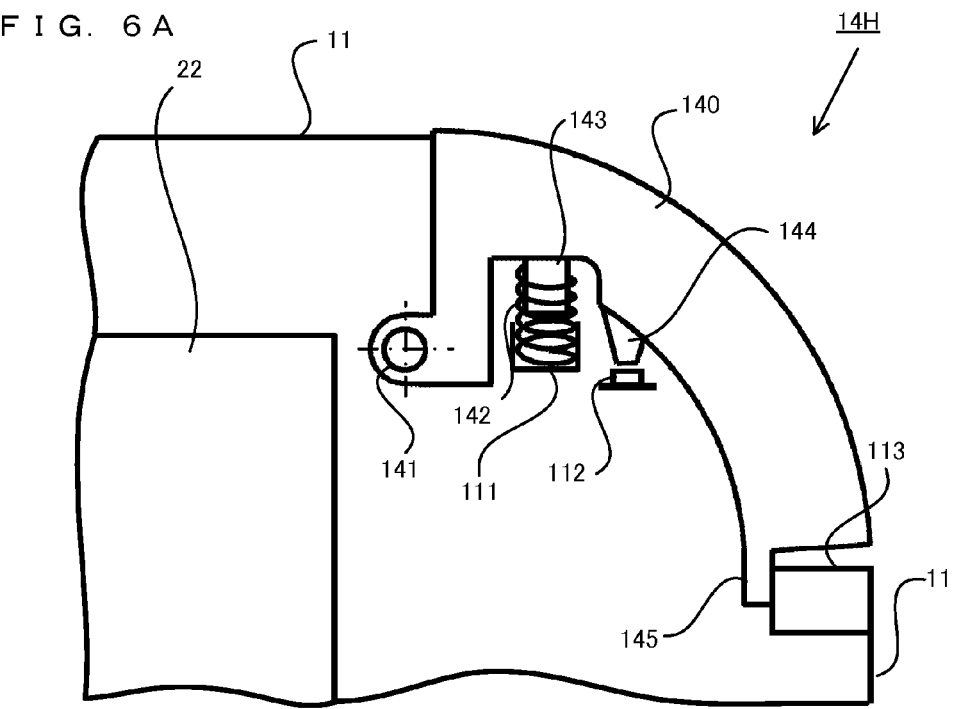
FIG. 6A is a diagram showing a non-limiting example of the internal structure of an R button 14H as viewed from the front surface side in the state where the R button 14H is not pressed.
Figure 6B:
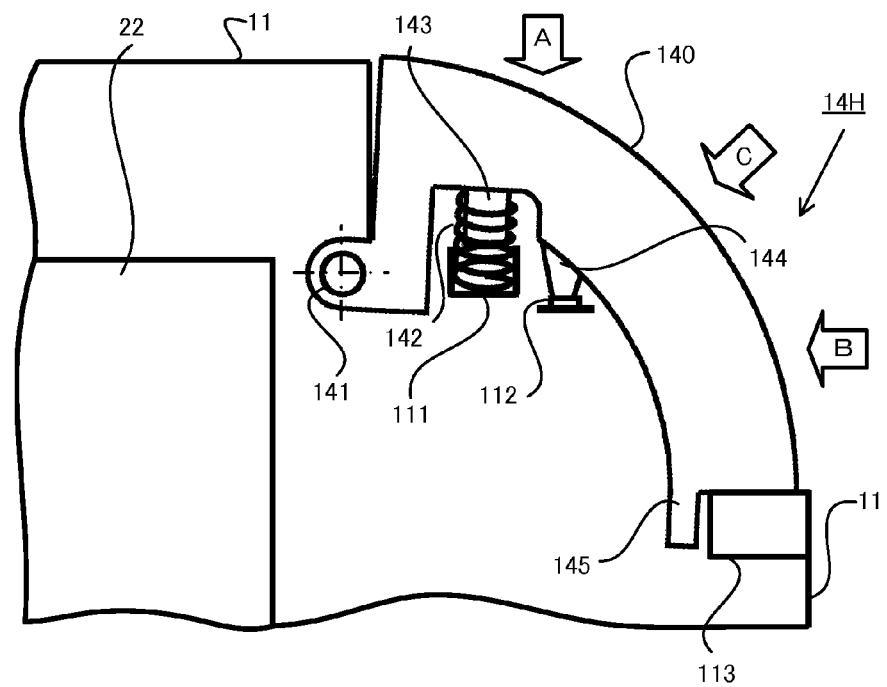
FIG. 6B is a diagram showing a non-limiting example of the internal structure of the R button 14H as viewed from the front surface side in the state where the R button 14H has been pressed.

Next, with reference to FIGS. 6A and 6B, the structures of the L button 14G and the R button 14H are described. It should be noted that FIG. 6A is a diagram showing an example of the internal structure of the R button 14H as viewed from the front surface side in the state where the R button 14H is not pressed. FIG. 6B is a diagram showing an example of the internal structure of the R button 14H as viewed from the front surface side in the state where the R button 14H has been pressed. To illustrate the internal structure of the R button 14H, FIGS. 6A and 6B show the housing 11 by omitting a part of the housing 11. Further, the internal structure of the L button 14G is symmetrical to that of the R button 14H in the left-right direction.

In FIGS. 6A and 6B, the R button 14H includes a press member 140, a spring 142, and a switch 112. The press member 140 is formed into a quadrant arc. Then, the arcuate outer peripheral surface of the press member 140 is exposed to the outside of the housing 11 and is disposed at a corner portion connecting the upper end surface and the right side surface of the housing 11. It should be noted that the press member 140 does not need to be a quadrant arc, so long as the press surface of the press member 140 is formed into a curved surface connecting the upper side surface and the right side surface of the housing 11. The press member 140 may be formed into an approximate quadrant arc, or a quarter-elliptical arc, or an arc obtained by cutting a race-track-shaped outer edge vertically and horizontally into quarters.

In an inner portion of the press member 140, which is not exposed to the outside, a pivotal shaft 141, a spring support shaft 143, a switch abutment portion 144, a non-pressed-state abutment piece 145, and the like are formed. The pivotal shaft 141 is axially supported in the housing 11 such that the axial direction is the depth direction of the game apparatus 1 (the direction from the front surface to the back surface of the housing 11). The press member 140 is supported in the housing 11 so as to be pivotable about the pivotal shaft 141. As shown in FIGS. 6A and 6B, the pivotal shaft 141 is provided at a position to the left of an upper end portion of the press member 140, and above a lower end portion of the press member 140, and above the midpoint of the upper end portion and the lower end portion. Based on this, clockwise moment of force is applied to the press member 140 about the pivotal shaft 141 even if the outer peripheral surface of the press member 140 has been pressed in any direction, for example, if the outer peripheral surface of the press member 140 has been pressed from above (pressed in the direction from the upper end surface to the lower end surface; a direction A shown in FIG. 6B), or if the lower end side of the outer peripheral surface has been pressed from the side (in the direction from the right side surface to the left side surface; a direction B shown in FIG. 6B), or if the outer peripheral surface has been pressed from obliquely above (in the direction from the corner of the upper end surface and the right side surface to the corner of the lower end surface and the left end surface; a direction C shown in FIG. 6B). Thus, even if the press member 140 has been pressed in any direction, the press member 140 pivots clockwise about the pivotal shaft 141.

The spring support shaft 143 is provided so as to stand downward on the inner surface of the press member 140, and the spring 142 is provided around the outer periphery of the spring support shaft 143. The spring 142 is supported in the housing 11 by being loosely inserted into a spring support case 111 while being provided around the spring support shaft 143. The spring support case 111 is provided fixedly within the housing 11. Based on this, the press member 140 is urged upward by the spring 142 and is also urged counterclockwise about the pivotal shaft 141.

As shown in FIG. 6A, when the press member 140 is not being subjected to a pressing operation, the upper end portion of the press member 140, while being urged counterclockwise by the spring 142, abuts the right end of the upper end surface of the housing 11 and is also placed at a position where the non-pressed-state abutment piece 145 formed at the lower end of the press member 140 abuts an abutment portion 113 formed near the upper end of the right side surface of the housing 11. At this time, the switch abutment portion 144 provided so as to stand downward on the inner surface of the press member 140 is not in contact with the switch 112 provided fixedly within the housing 11.

If the outer peripheral surface of the press member 140 in a non-pressed state as shown in FIG. 6A has been pressed from above (in the direction A shown in FIG. 6B), or pressed from the side (in the direction B shown in FIG. 6B), or pressed from obliquely above (in the direction C shown in FIG. 6B), the press member 140 pivots clockwise about the pivotal shaft 141. Then, when the press member 140 is being subjected to a pressing operation, the press member 140 is urged counterclockwise by the spring 142 and pivots clockwise to a position where the lower end of the press member 140 abuts the upper end of the right side surface of the housing 11. At this time, the switch abutment portion 144 comes into contact with the switch 112, and in accordance with the contact, the switch 112 outputs to the information processing section 31 an operation signal indicating that the R button 14H has been pressed.

As described above, in addition to the fact that the press surface of the R button 14H is formed into a quadrant arc connecting the upper end surface and the right side surface of the housing 11, the pivotal shaft that pivots when the button 14H has been subjected to a pressing operation is provided at a position shifted to the left from the upper end of the press surface and also at a position above the midpoint of the upper end and the lower end of the press surface. Thus, the R button 14H can be subjected to a press operation in various directions such as the vertical direction from the upper side surface to the lower side surface, the horizontal direction from right to left, and the oblique direction from upper right to lower left. It should be noted that the L button 14G and the R button 14H may be configured to be pressed in the vertical direction, the horizontal direction, and the oblique direction with other structures. Alternatively, the game apparatus 1 may include only either one of the L button 14G and the R button 14H.

It should be noted that the above embodiment describes an example of a liquid crystal display section including two screens, using the case where the lower LCD 12 and the upper LCD 22, physically separated from each other, are placed above and below each other (the case where the two screens correspond to upper and lower screens). The game apparatus 1, however, may include a single display screen, or the structure of a display screen corresponding to two screens may be another structure.

Figure 7:
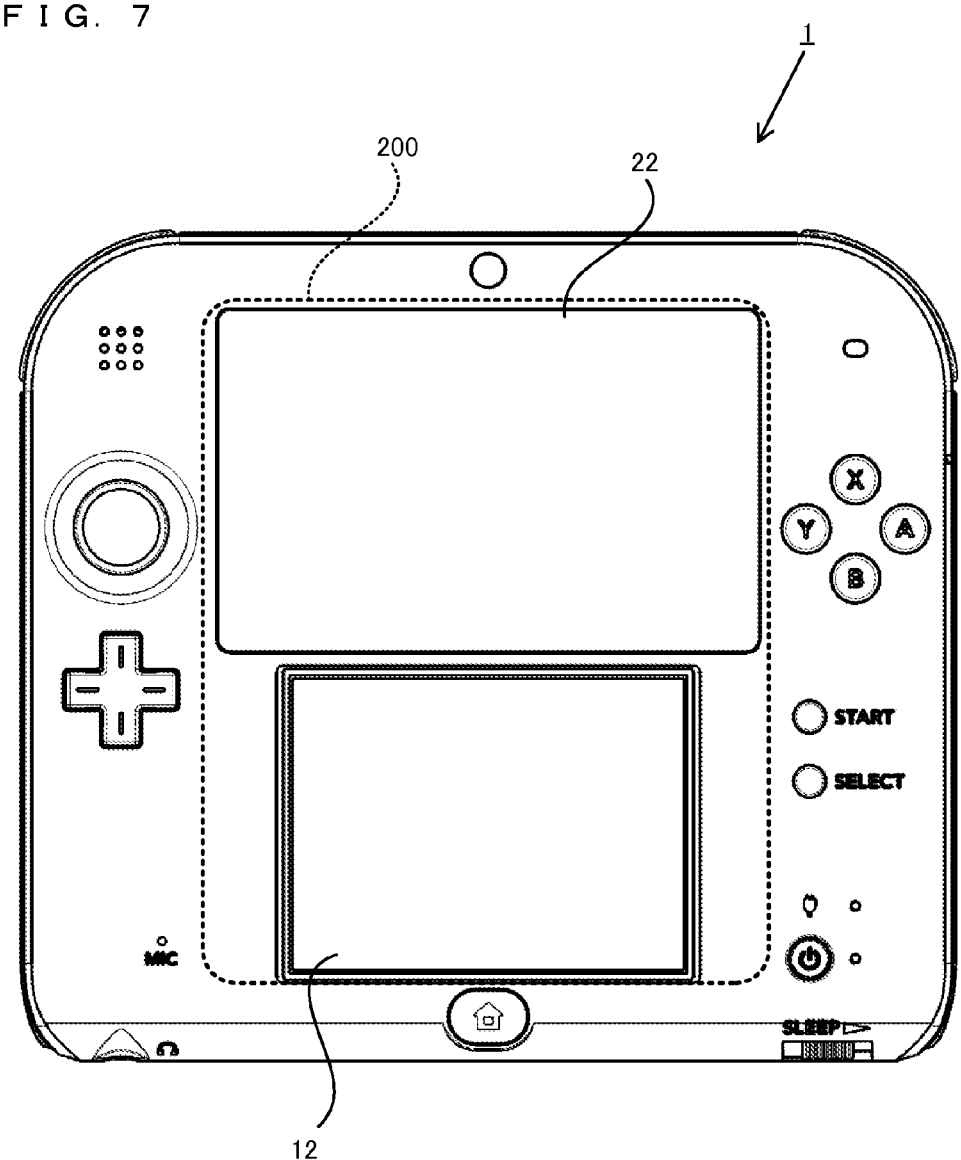
FIG. 7 is a diagram showing a non-limiting example where a lower LCD 12 and an upper LCD 22 are formed using a single liquid crystal display apparatus 200.

For example, as shown in FIG. 7, the lower LCD 12 and the upper LCD 22 may be formed using different areas in a single display apparatus (for example, a single liquid crystal display apparatus 200). For example, the front surface of the housing 11 that serves as outer frames of the lower LCD 12 and the upper LCD 22 is placed on a single liquid crystal display apparatus 200, and display screens of the liquid crystal display apparatus 200 to be located within these two outer frames function as the lower LCD 12 and the upper LCD 22. Alternatively, an LCD having a display size of two screens in the vertical direction may be disposed on the front surface of the housing 11, and images to be displayed on the lower LCD 12 and the upper LCD 22 may be displayed in the upper and lower portions (that is, displayed adjacent to each other without a boundary portion between the upper and lower portions). Further, when two images are displayed using two divided portions in what is physically a single screen, the touch panel 13 may be provided on the entire screen. Generally, the provision of a plurality of physically separated display apparatuses may increase the component costs and the production costs. In contrast, different areas set in a single display apparatus may function as a plurality of display screens, whereby it is possible to greatly reduce the component costs and the production costs of the apparatus.

In addition, the lower LCD 12 and the upper LCD 22 may be placed on the left and right of the front surface of the housing 11. Alternatively, a horizontally long LCD having the same vertical length as that of the lower LCD 12 and having a horizontal length twice that of the lower LCD 12 may be provided on the front surface of the housing 11, and images to be displayed on the lower LCD 12 and the upper LCD 22 may be displayed in the left and right portions (that is, displayed adjacent to each other without a boundary portion between the left and right portions).

In addition, in the above embodiment, the touch panel 13 is integrated with the game apparatus 1. It goes without saying, however, that the exemplary embodiment can be achieved also with the structure where a game apparatus and a touch panel are separated from each other. Further, the touch panel 13 may be provided on the surface of the upper LCD 22.

In addition, the exemplary embodiment describes an example of the information processing apparatus, using the handheld game apparatus 1. Alternatively, the exemplary embodiment may be applied to a portable apparatus that does not perform information processing, or performs a part of information processing, in combination with a stationary game apparatus. For example, the portable apparatus can be provided with a display screen and can output operation data based on a user operation. Then, the stationary game apparatus performs information processing based on the operation data acquired from the portable apparatus, and outputs an image based on the result of the information processing to the portable apparatus. The exemplary embodiment can be applied also to an apparatus that functions as a so-called thin client terminal, which does not perform information processing as described above.

In addition, the information processing apparatus according to the exemplary embodiment may be not only a game apparatus but also any handheld electronic device such as a PDA (Personal Digital Assistant), a mobile telephone, a personal computer, or a camera.

It should be noted that another apparatus may perform at least some of the processing steps in the information processing to be performed by the information processing apparatus according to the exemplary embodiment. For example, if the game apparatus 1 is further configured to communicate with another apparatus (for example, another server, another game apparatus, or another mobile terminal), the other apparatus may cooperate to perform the processing steps in the information processing. Further, in the above embodiment, the information processing is performed by the CPU 311 of the game apparatus 1 executing a predetermined game program. Alternatively, some or all of the information processing may be performed by a dedicated circuit included in the game apparatus 1.

Here, the above variations make it possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a handheld information processing apparatus (the information processing apparatus according to the exemplary embodiment) by the cooperation of the apparatuses. It should be noted that, in these system forms, there is no particular limitation on which apparatus performs the process of each step of the information processing. Thus, it goes without saying that it is possible to achieve the exemplary embodiment by sharing the processing in any manner.

In addition, the shape of the game apparatus 1 described above, and the shapes, the numbers, the installation positions, and the like of the display apparatus and the input apparatus provided in the game apparatus 1 are merely illustrative. Thus, it goes without saying that the exemplary embodiment can be achieved also with other shapes, other numbers, and other installation positions.

In addition, the program to be executed by the game apparatus 1 may be supplied to the game apparatus 1 not only through an external storage medium such as the external memory 45, but also through a wired or wireless communication link. Further, the program may be stored in advance in a non-volatile storage device included in the game apparatus 1. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

The exemplary embodiment can provide a novel information processing apparatus and a novel information processing system, and is useful as a portable information processing apparatus, an information processing system including a portable input apparatus, and the like.

What is claimed is:

1. A portable information processing apparatus for performing predetermined processing in accordance with a user operation, the information processing apparatus comprising:
    a housing so shaped that a thickness of an upper side surface of the housing is greater than a thickness of a lower side surface of the housing such that the closer to the lower side surface, the thinner the housing; and
    at least one operation button provided on the upper side surface of the housing, wherein
    the at least one operation button is two operation buttons provided on left and right of the upper side surface of the housing, and wherein
    in the operation button provided on the left, a press surface to be pressed by a user is formed into a curved surface that connects the upper side surface and a left side surface of the housing, and in the operation button provided on the right, a press surface to be pressed by the user is formed into a curved surface that connects the upper side surface and a right side surface of the housing.

2. The information processing apparatus according to claim 1, wherein
    a length of a press surface of the operation button in a thickness direction of the upper side surface is substantially the same as the thickness of the upper side surface.

3. The information processing apparatus according to claim 1, wherein
    an inclined surface is formed on at least a part of the upper side surface, the inclined surface extending and intersecting a front surface of the housing at an acute angle.

4. The information processing apparatus according to claim 1, wherein
    an inclined surface is formed on the operation button, the inclined surface extending and intersecting a front surface of the housing at an acute angle.

5. The information processing apparatus according to claim 1, wherein
    inclined surfaces are formed on at least part of a left side surface and a right side surface of the housing, the inclined surfaces extending and intersecting a front surface of the housing at an acute angle.

6. The information processing apparatus according to claim 5, wherein
    the inclined surfaces formed on the at least part of the left side surface and the right side surface of the housing are formed on substantially an entirety of the left side surface and the right side surface of the housing.

7. The information processing apparatus according to claim 1, further comprising
    at least one operation section provided on an upper side surface side on a front surface of the housing and different from the operation button.

8. The information processing apparatus according to claim 1, wherein
    a center of gravity of the information processing apparatus is set on the upper side surface side of the housing.

9. The information processing apparatus according to claim 1, wherein
    the two operation buttons are provided in left and right end portions of the upper side surface of the housing.

10. The information processing apparatus according to claim 1, further comprising
    a plurality of display screens provided on a front surface of the housing.

11. The information processing apparatus according to claim 10, wherein
    the plurality of display screens are formed using a plurality of portions of a single display screen.

12. The information processing apparatus according to claim 1, wherein
    the operation button provided on the left is configured to be pressed at least in a direction from the upper side surface to the lower side surface and in a direction from left to right, and the operation button provided on the right is configured to be pressed at least in a direction from the upper side surface to the lower side surface and in a direction from right to left.

13. The information processing apparatus according to claim 1, wherein
    each of the curved surfaces is formed into a quadrant arc.

14. An information processing system, including a portable input apparatus, for
    performing predetermined processing in accordance with a user operation performed using the input apparatus, the input apparatus comprising:
    a housing so shaped that a thickness of an upper side surface of the housing is greater than a thickness of a lower side surface of the housing such that the closer to the lower side surface, the thinner the housing; and
    at least one operation button provided on the upper side surface of the housing, wherein
    the at least one operation button is two operation buttons provided on left and right of the upper side surface of the housing, and wherein
    in the operation button provided on the left, a press surface to be pressed by a user is formed into a curved surface that connects the upper side surface and a left side surface of the housing, and in the operation button provided on the right, a press surface to be pressed by the user is formed into a curved surface that connects the upper side surface and a right side surface of the housing.

* * * * *